Aug. 7, 1923.
P. J. SIMMEN
1,464,141
AUTOMATIC SPEED CONTROL FOR RAILWAYS
Filed July 30, 1915  2 Sheets-Sheet 2
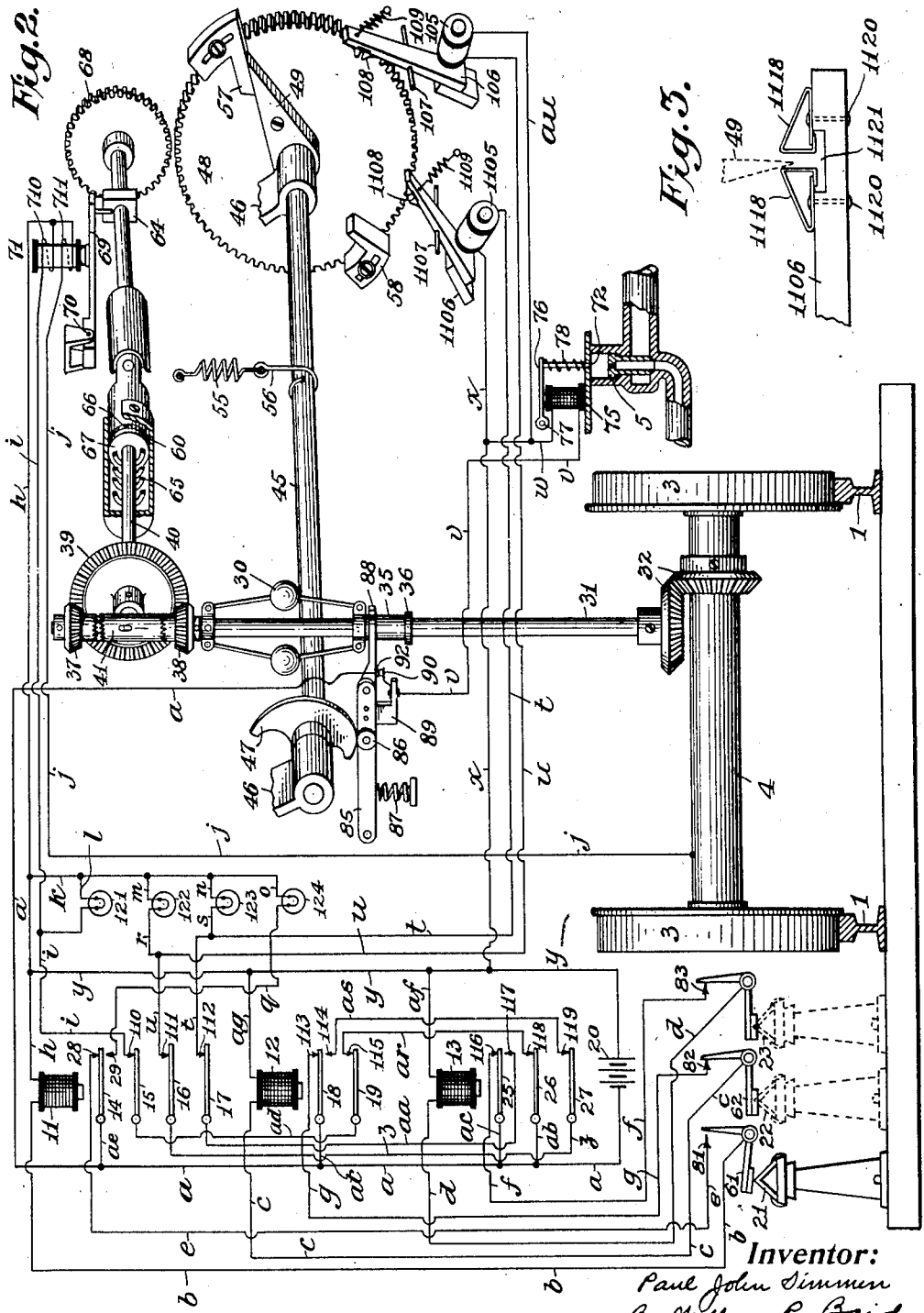
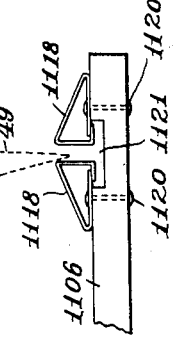
Inventor:
Paul John Simmen
By William R. Baird
his Atty.

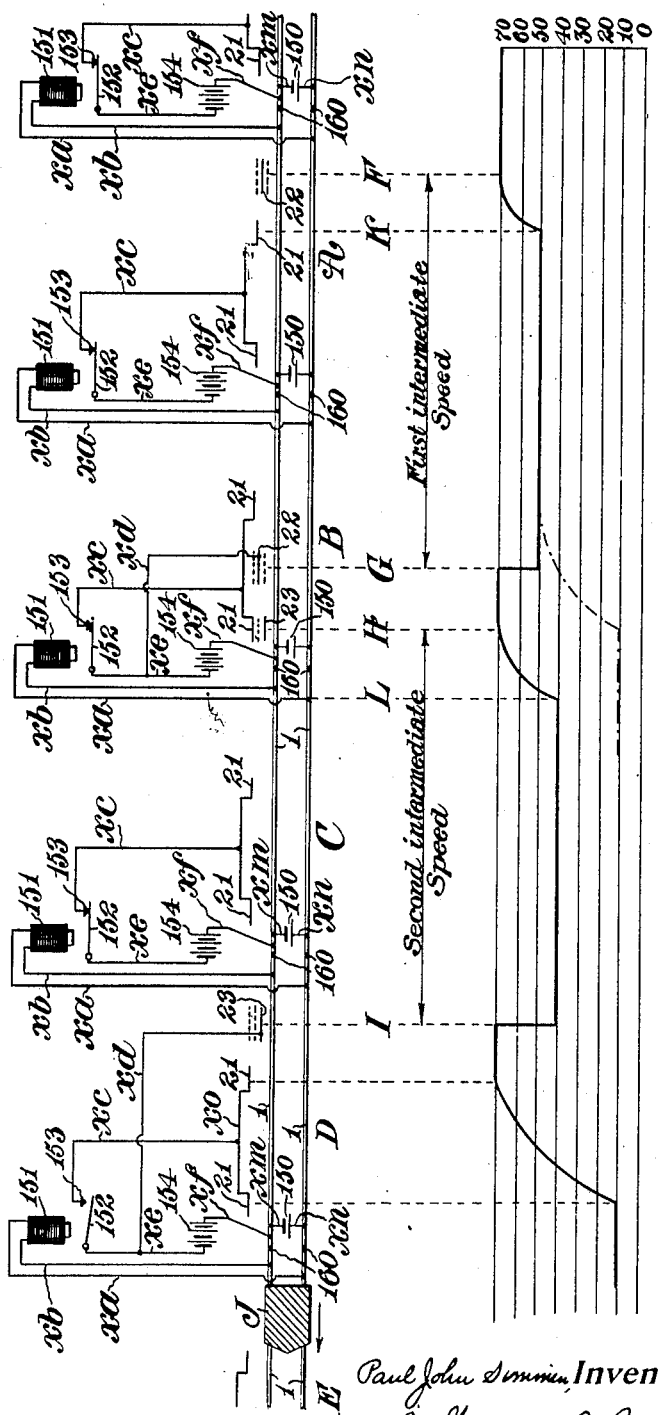

Patented Aug. 7, 1923.

1,464,141

UNITED STATES PATENT OFFICE.

PAUL JOHN SIMMEN, OF BUFFALO, NEW YORK.

AUTOMATIC SPEED CONTROL FOR RAILWAYS.

Application filed July 30, 1915. Serial No. 42,765.

*To all whom it may concern:*

Be it known that I, PAUL JOHN SIMMEN, a citizen of the United States, residing at Buffalo, in the county of Erie and State of New York, have invented certain new and useful Improvements in Automatic Speed Controls for Railways, of which the following is a specification.

This invention relates to an apparatus for automatically controlling the speed of a vehicle moving along a railway and its novelty consists in the construction and adaptation of the parts, as will be more fully hereinafter pointed out.

In Letters Patent of the United States, 1,150,308 dated August 17, 1915, and in another 1,150,309 dated August 17, 1915, I have described an automatic apparatus for controlling the speed of a moving vehicle, which in brief, comprises a device moving in accordance with a permissible speed together with means whereby, when the actual speed exceeds the permissible speed retarding mechanism, with which the vehicle is equipped, is set into operation to reduce its speed or ultimately to stop the vehicle. The device moving in accordance with a permissible speed is so actuated that in moving from the maximum speed to the minimum speed a speed distance curve is generated which corresponds to the well known braking curve derived from experimental data.

In another copending application for Letters Patent of the United States, Serial No. 14,075, filed March 13th, 1915, I have described an apparatus for the automatic control of the speed of moving vehicles, which in addition to providing a permissible maximum speed under safety conditions, and a permissible minimum speed under danger conditions, and moving the permissible speed device from maximum speed to minimum speed in accordance with the speed distance curve, provides for a submaximum position of the permissible speed device upon receipt of a caution signal. In this device the movement of the permissible speed device from maximum to submaximum position is based on a definite time interval.

The subject matter of the present application is specifically to provide for setting the permissible speed at a plurality of submaximum positions, the movement from maximum position to any submaximum position being in every case accomplished in accordance with the speed distance curve heretofore described. It will be clear that in the last described application the setting of the submaximum speed would be the result of temporary hazards, that is, the receipt of a caution signal by the train. In the present application, the submaximum speeds result from permanent hazards, the controlling element being located along the trackway.

In the drawings, there is illustrated a preferred form of apparatus embodying my invention, the parts being shown largely in diagram for the sake of promoting clearness in the description, and the position of the parts being that assumed when a clear signal has been indicated on the vehicle and the permissive speed indicating shaft and cam have been brought to a maximum position. For purposes of clearness, I have also shown three relays, three contact shoes, and three signal rails, which provides two submaximum speeds. It will be clear, however, to anyone skilled in the art that the variation in the number is well within the skill of an engineer after the principles governing the operation of the invention are understood.

In Figure 1 there is shown a diagram of a trackway divided into five blocks, in which are located the highway control apparatus for actuating the vehicle carried devices. It will be understood, however, that these devices might be actuated by means of a central control system as described in my copending application for Letters Patent of the United States, Serial No. 661,112, filed November 18th, 1911. In the lower part of the figure there is shown the relation of the vehicle to the speed curve; Figure 2 shows in diagram the vehicle carried devices; and Figure 3 shows in detail the detent on one of the submaximum arms.

In the following description, the electrical conductors connecting the different parts are designated by the lower case letters of the alphabet.

In the drawings the track equipment is as follows: 1, 1 indicate track rails along which the vehicle is adapted to travel. These rails are divided by insulated joints 160 into blocks A, B, C, D and E. At one end of each of these blocks is a track battery 150 connected to the track rails 1, 1 by wires xm and xn. At the other end of each block is a track relay 151 connected to the track rails 1, 1 by the wires xa and xb. Adjacent to the entrance of each block are placed home and distant signal rails 21, which may appropriately be called "main" or "principal" signal rails. The energization or deenergization of these main signal rails 21 is controlled by means of the track relay 151, having an armature 152, a battery 154, a contact 153, and sundry conductors, and the circuit through them is as follows: from the positive side of the battery 154 to the wire xe, the armature 152, contact 153, wire xc, wire xo, to the main signal rails.

Located along the trackway at any desirable point are auxiliary signal rails indicated at 22 and 23. The rails 22 are nearer to the gauge line of the track than the rails 21, and the rails 23 are nearer to the gauge line of the track than the rails 22. These auxiliary rails 22 or 23 are permanently energized or deenergized, the former being accomplished by the connection to the battery 154 through a wire xd.

In Figure 2 there is shown the car equipment. In this figure, 1, 1 indicate the track rails, 3, 3 are the wheels of the vehicle, 4 is its axle, and the ordinary train pipe air valve controlling the brake system is generally indicated at 5. 61, 62 and 63 are three shoes, each hingedly mounted at a convenient place on the car and adapted to contact with the signal rails 21, 22 and 23 respectively (the auxiliary rails in this view being shown in dotted outline). During such contact with a signal rail, the different shoes break contact with contact points 81, 82 or 83, and after leaving such signal rail are restored by gravity or spring pressure to their respective contact point. 11 is a relay which may be placed at any convenient point on the vehicle and which may be appropriately called a main signal relay, and 12 and 13 are relays also on the vehicle, which may be called auxiliary signal relays. These several relays are connected to the shoes 61, 62 and 63 respectively.

The relay 11 has four neutral armatures 14, 15, 16 and 17 adapted when the relay is energized to touch contacts 28, 110, 111 and 112 respectively. When the relay 11 is deenergized, the armature 14 touches a contact 29. The relay 12 has two neutral armatures 18 and 19 adapted when the relay is energized to touch contacts 113 and 115 respectively. When this relay 12 is deenergized the armature 18 touches a contact 114. The relay 13 has three neutral armatures 25, 26 and 27 adapted when the relay is energized to touch contacts 116, 118 and 119 respectively. When the relay 13 is deenergized, the armature 25 touches a contact 117. 20 is a local battery mounted on the vehicle.

121 is a clear signal or green light or maximum speed indicator. 122 is a submaximum speed indicator. 123 is a second submaximum speed indicator, and 124 is a danger signal or red light or minimum speed indicator. The indicators 122 and 123 may be distinguished from each other by using colors, such for example yellow for 122 and purple for 123, or there may be ground glass inclosures provided for them, which would have the desired speed painted upon them.

Also mounted on the vehicle is a centrifugal governor 30 moved from a shaft 31 by a gear 32 on the wheel axle 4. On the ball frame of the governor is a sleeve 35 slidable on the shaft 31 and provided with an annular flange 36. At its upper end the shaft 31 is provided with gears 37 and 38, each adapted to mesh with a gear 39 mounted on a shaft 40. Between the gears 37 and 38 is a sleeve 41 slidable on the shaft 31 and indented at both ends to engage similarly indented annular flanges on the gears 37 and 38, but which indentations run in opposite directions whereby the shaft 40 is always rotated in the same direction, no matter in which direction the shaft 31 is rotated.

A shaft 45 is mounted in suitable bearings 46 and near one end is provided with a speed control cam 47 and at its opposite end with a gear 48 and a wing 49. A spring 55 and a cord 56 serve to retract the shaft 45 to its original position after rotation and release. Detents 57 and 58 are adjustably mounted in the circular path of the wing 49 to limit the extent of the movement of the shaft 45. The shaft 45 is moved from the shaft 40 by means of a power transmitting mechanism including a friction clutch indicated at 60, a shaft supported upon and carried by a bearing 64 and a pinion 68 adapted to mesh with the gear 48. The clutch comprises two discs 67 and 66 pressed together by a spring 65 and so arranged that they slip when undue torsional strain is brought upon the shaft. The bearing 64 is suspended from an arm 69 swung upon a pivot 70, the arm being the armature of an electromagnet 71, which is provided with two coils indicated at 710 and 711.

Adjacent to the train air pipe valve indicated at 5 is a relay 75 having an armature 76 pivoted at 77 and adapted to compress a spring 78 normally adapted to hold open the valve 5, which is a valve such as is well known in the art for permitting the air in the train line to exhaust to the atmosphere and thus apply the brakes when the coil 75 is deenergized.

Hingedly mounted near the cam 47 is an arm 85, carrying a roller 86 adapted to contact with said cam, a compression spring 87 serving to promote such contact. The arm 85 is provided with a pivoted ork 88, adapted to straddle the collar 35 but to contact with the flange 36. The arm 85 also carries a supplemental arm 89 made of insulating material and carrying a contact member 90 adapted to touch a similar ontact member 92 carried by the arm 85.

Two electromagnets 105 and 1105 are conveniently located near the gear 48, their armatures 106 and 1106 being mounted to swing on pivots 107 and 1107, and being rovided with detents or catches 108 and 1108 to co-operate with the wing 49 at different predetermined points in its revolution. Tension springs 109 and 1109 serve to hold the armatures normally away from he gear. Figure 3 shows a detailed view of the detent 1108. The end of the arm 1106 which carries the detent has a rectangular section 1121 removed. Mounted upon the arm 1106 by rivets 1120 are two pring members 1118, so located that their free ends when depressed will enter the cavity 1121, but when released will return to their normal position. Then if the wing 49 attempts to pass either of these detents when the arm 1106 is in its energized position, it will be retained between these members.

The main signal rails 21 are controlled by the usual track circuit. For example, a train J in block E (see Figure 1) will cause the track relay 151 for that block to be deenergized, and this will cause the main signal rails 21 at the entrance to that block to be deenergized.

Let it be assumed that the rail 21 is energized and that its shoe 61 has been moved into contact therewith and has been lifted to break the connection between the shoe and contact 81; also that the relays 12 and 13 have been positively energized and are maintained energized through their stick circuit (as will hereinafter be described). With rail 21 energized the main relay 11 becomes energized through the following circuit: from the battery 154 to the wire $xe$, armature 152, contact 153, wire $xc$, wire $xo$, signal rail 21, shoe 61, wire $b$, relay 11, wire $h$, coil 711, wire $j$, axle 4, track rails 1, 1 and wire $xf$ to battery 154. This causes the green light 121 to glow through the following circuit: from the positive side of the battery 20 to the wire $a$, wire $ab$, armature 26, contact 118, wire $ar$, contact 115, armature 19, wire $ad$, armature 15, contact 110, wire $i$, green light 121, wire $l$, wire $k$, wire $h$ and wire $y$ to the negative side of battery 20. This also causes the coil 710 to be energized through the following circuit: from the positive side of the battery 20 to the wire $a$, wire $ab$, armature 26, contact 118, wire $ar$, contact 115, armature 19, wire $ad$, armature 15, contact 110, wire $i$, coil 710, wire $h$ and wire $y$ to the negative side of the battery 20.

Upon the vehicle leaving the signal rail 21, the relay 11 remains energized through the following holding circuit: from the positive side of the battery 20 to the wire $a$, wire $ae$, armature 14, contact 28, wire $e$, contact 81, shoe 61, wire $b$, relay 11, wire $h$ and wire $y$ to the negative side of the battery 20. This causes the green light 121 to continue to glow, and causes the coil 710 to remain energized. The coil 711, however, is deenergized as soon as the car leaves the rail, as there is no longer a current flow to ground.

If the signal rail 21 is deenergized, the holding circuit will be broken at the contact 81 and the relay 11, coils 710, 711, 105 and 1105 will all be deenergized. The red light 124, however, will glow through the following circuit: from the positive side of the battery 20 to the wire $a$, wire $ae$, armature 14, contact 29, wire $q$, red light 124, wire $o$, wire $k$, wire $h$ and wire $y$ to the negative side of the battery 20.

Now, let it be assumed that auxiliary signal rail 22 is energized, and that its shoe 62 has been moved into contact therewith and has been lifted to break the connection between such shoe and its contact 82. A circuit is then completed as follows: from the positive side of the battery 154 to the wire $xe$, wire $xd$, auxiliary signal rail 22, shoe 62, wire $c$, relay coil 12, wire $ag$, wire $y$, wire $h$, coil 711, wire $j$, axle 4, rails 1, 1 and wire $xf$, to the negative side of the battery 154.

Upon the car leaving the signal rail, the relay 12 remains energized through the following holding circuit: from the positive side of the battery 20 to the wire $a$, wire $at$, armature 18, contact 113, wire $g$, contact 82, shoe 62, wire $c$, relay coil 12, wire $ag$ and wire $y$ to the negative side of the battery 20.

If the auxiliary signal rail 22 is deenergized the holding circuit for the relay 12 will be broken at the contact 82. When relay 12 is deenergized and relays 11 and 13 are energized, the first submaximum light or indicator 122 will glow through the following circuit: from the positive side of the battery 20 to the wire $a$, wire $at$, armature 18, contact 114, wire $as$, contact 119, armature 27, wire $z$, armature 16, contact 111, wire $u$, wire $r$, lamp 122, wire $m$, wire $k$, wire $h$ and wire $y$ to the negative side of the battery 20. Under such conditions, the coil 105 will also be energized through the following circuit: from the positive side of the battery 20 to the wire $a$, wire $at$, armature 18, contact 114, wire $as$, contact 119, armature 27, wire $z$, armature 16, contact 111, wire $u$, coil 105, wire $au$, wire $w$, wire

$x$ and wire $y$ to the negative side of the battery 20. It will be noted that if the relay 12 is deenergized and relay 11 is also deenergized, the coil 105 will be deenergized and light 122 will not be glowing but that the red light 124 will, however, be glowing.

Now let it be assumed that rail 23 is energized and that its shoe 63 has been moved into contact therewith and has been lifted to break the connection between such shoe and the contact 83. The relay 13 is then energized through the following circuit: from the positive side of the battery 154 to the wire $xe$, wire $ad$, auxiliary signal rail 23, shoe 63, wire $d$, relay coil 13, wire $af$, wire $y$, wire $h$, coil 711, wire $j$, axle 4, track rails 1, 1 and wire $xf$ to the negative side of the battery 154.

After the car leaves the energized rail 23, the relay 13 will remain energized through the following holding circuit: from the positive side of the battery 20 to the wire $a$, wire $ac$, armature 25, contact 116, wire $f$, contact 83, shoe 63, wire $d$, relay coil 13, wire $f$ and wire $y$ to the negative side of the battery 20. If the auxiliary signal rail 23 is deenergized, the holding circuit will be broken at the contact 83 and the relay 13 will become deenergized. When relay 13 is deenergized and the relay 11 is energized, the second submaximum light 123 will glow through the following circuit: from the positive side of the battery 20 to the wire $a$, wire $ac$, armature 25, contact 117, wire $aa$, armature 17, contact 112, wire $t$, wire $s$, light 123, wire $n$, wire $k$, wire $h$ and wire $y$ to the negative side of the battery 20. The coil 1105 will also be energized through the following circuit: from the positive side of the battery 20 to the wire $a$, wire $ac$, armature 25, contact 117, wire $aa$, armature 17, contact 112, wire $t$, coil 1105, wire $x$ and wire $y$ to the negative side of the battery 20. It will be noted, however, that if the relay 13 is deenergized and relay 11 is also deenergized the coil 1105 will be deenergized and the light 123 will not be glowing but that the red light 124 will, however, be glowing.

When the points 90 and 92 are in contact the following circuit is established: from the positive side of the battery 20 to the wire $a$, contact 92, contact 90, wire $v$, relay coil 75, wire $w$, wire $x$ and wire $y$ to the negative side of the battery 20. But when the contacts 92 and 90 are forced apart or are not in contact the coil 75 will be deenergized, the spring 78 will open the valve 72, and the air brake will be applied.

It will be noted that the magnet 71 is energized through the coil 711 whenever a shoe is standing on an energized signal rail whether such rail is 21, 22 or 23. After the car leaves a signal rail, however, there is only one condition under which the magnet 71 is maintained energized, and that is when the vehicle is carrying a clear signal. The object of this double coil arrangement for the magnet 71 is to insure the return of the cam 47 to normal position in case the change to be made is from a low speed indicating position to a higher speed indicating position.

The operation of this device is as follows: With a green light glowing, the magnet 71 is always energized when the vehicle is on a signal rail by the coils 710 and 711, and after leaving the signal rails by the coil 710 only. Therefore the pinion 68 is out of mesh with the gear 48 whenever a green light is displayed. It will be noted that a green light is displayed only when the main signal relay 11, and the auxiliary signal relays 12 and 13 are all energized.

Whenever the main signal relay 11 is deenergized, the magnet 71 will be deenergized, the red light will be glowing and magnets 105 and 1105 will be deenergized. Therefore the pinion 68 will drop into mesh with the gear 48 and this gear and its cam 47 will be driven to their minimum position. It will be seen that the above conditions continue whenever the main signal relay 11 is deenergized irrespective of the condition of the auxiliary relays 12 and 13.

Whenever the auxiliary relay 12 is deenergized and the auxiliary relay 13 and main relay 11 are energized, the first submaximum light 122 will glow, and the coil 105 will be energized thus placing the detent 108 in the path of wing 49. The deenergization of the relay 12 causes the coil 710 to become deenergized and the pinion 68 therefore drops into mesh with the gear 48 driving the gear 48 to the first submaximum position where it is held by the detent 108.

Whenever the auxiliary relay 13 is deenergized and the main relay 11 is energized, the second submaximum light 123 glows and the coil 1105 is energized, placing the detent 1108 in the path of the wing 49. The deenergization of the relay 13 also causes the deenergization of the coil 710, which permits the pinion 68 to drop into mesh with the gear 48 and the gear 48 is driven by the movement of the train to the second submaximum position where it is held by the detent 1108.

In case the relay 13 should, on acount of a defective circuit, be deenergized when it should not be, the deenergization of both auxiliary relays 12 and 13 combined with the energization of the main relay 11, would result in throwing in the second submaximum speed indicator 123, which is on the side of safety.

The reference letters and location of signal rails in Figure 1 will bring out clearly the practical application of this device. It will be noted that each block contains a home and distant main signal rail 21, Through such main signal rail the main relay 11 on the vehicle is controlled and the energization or deenergization of these rails 21 is controlled by temporary hazards, that is, by a vehicle in the block ahead, or by direct action of the train dispatcher. Let us now assume that at a point K in block A we wish to limit the maximum speed of every train to the first submaximum speed. We will at point F, which is at the proper distance in the rear of the point K, place a deenergized rail 22. If the necessity for this speed limitation exists from the point K to the point G, we will place at the point G an energized rail 22, which restores the permissible speed shaft and cam to the maximum position provided there is no train in the block in advance. If there is it would be to a minimum as indicated in dotted outline.

Now let us assume that at the point L, we wish to limit the speed of all trains to the second sub-maximum speed; we will place a deenergized rail 23 at point H, which is the proper distance in the rear of point L. It will be noted that point H happens to coincide with the location of a main signal rail 21. If the necessity for maintaining the second submaximum speed exists from the point L to the point I, but does not exist beyond the point I, we will place at the point I an energized rail 23, which will reset the permissible speed shaft to its maximum position, provided there are no trains in the block in advance. Should there be trains in the block in advance, however, the auxiliary relay 13 will become energized upon passing point I and will remain energized thus setting up the maximum speed as soon as the main relay 11 is energized through passing an energized main signal rail.

It will be evident to anyone skilled in the art that it is possible to place the auxiliary signal rails at any desired point along the trackway and to arrange them so that a transfer may be made from the maximum speed to any submaximum speed, from one submaximum speed to another or from any submaximum speed to the maximum speed.

At the lower part of Figure 1, there is shown a scale in which the vertical distances or ordinates represent permissible speeds and the horizontal distances or abscissas represent distances. The speed curve or line of a vehicle passing over the route described would there be indicated by the heavy line. For instance, say a speed of 70 miles per hour were permitted to a train coming in from the right. When the point F is reached the speed curve would be instituted and the speed would be permitted only at the rate indicated by the falling curve until a permissible submaximum rate, say fifty miles per hour, is reached, and this would be allowed until the point G is reached, when at that point the maximum speed would be indicated. This speed could be continued until H is reached when the curve would again be instituted running down to a second submaximum, say forty miles per hour. This would be allowed until the point I is reached when the maximum would be restored as before. Then at I the maximum speed would be indicated, and continued until the rail 21 in block D is reached when, owing to the presence of the train J, the danger or minimum speed would be indicated and the permissible speed gradually reduced as shown by the curve.

I claim:—

1. A safety apparatus for the automatic control of the speed of a vehicle moving along a trackway, comprising a highway control including two series of signal rails, one a series adapted to be employed in the indication of a permissible speed for the vehicle corresponding to temporary hazards existing along the trackway, and the other a series adapted to be employed in the indication of a permissible speed for the vehicle corresponding to permanent hazards existing along the highway.

2. An apparatus for the control of a vehicle moving along a highway comprising a series of devices on the vehicle indicating when actuated the existence of maximum, submaxima and minimum rate of speed conditions due either to permanent or temporary track hazards, a device also on the vehicle adapted to be moved from the running gear of the vehicle to various positions corresponding to the several permissible speeds, means adapted to retard the vehicle actuated from the latter device when the permissible speed is exceeded, a control along the highway adapted to electrically actuate that one of the speed indicating devices which corresponds to the proper safety condition and means on the vehicle adapted to maintain in position such device after the highway control has been passed by the vehicle in its movement along the highway.

3. An apparatus for the control of a vehicle moving along a highway comprising a series of devices on the vehicle indicating when actuated the existence of maximum, submaxima and minimum rate of speed conditions due either to permanent or temporary track hazards, a device also on the vehicle adapted to be moved from the running gear of the vehicle to various positions corresponding to the several permissible speeds, means adapted to retard the vehicle actuated from the latter device when the permissible speed is exceeded, a control along the highway adapted to electrically actuate that one of the speed indicating devices which corresponds to the proper safety condition, and means on the vehicle adapted to maintain in position such device after the highway control has been passed by the vehicle in its movement along the highway, the highway control comprising two series of signal rails, one used to regulate the speed in accordance with permanent hazards and the other in accordance with temporary hazards.

4. In apparatus of the character set forth, the combination with a vehicle, of a permissive speed device movable between a maximum clear position and and a minimum danger position, means for moving the permissive speed device to and positively maintaining it at a plurality of caution positions between the maximum and minimum positions, traffic controlling means, and mechanism for operating the traffic controlling means whenever the actual speed of the vehicle exceeds the permissive speed as determined by the position of the permissive speed device.

5. In apparatus of the character set forth, the combination with a vehicle, of a permissive speed device movable between a maximum clear position and a minimum danger position, means for moving the permissive speed device to and positively maintaining it at a plurality of caution positions between the maximum and minimum positions, said means including trackside mechanism, traffic controlling means, and mechanism for operating the traffic controlling means when the actual speed of the vehicle exceeds the permissive speed as determined by the position of the permissive speed device, said operating mechanism including a device operating in accordance with the speed of the vehicle, and said device governing the actuation of said operating mechanism.

6. In apparatus of the character set forth, the combination with a vehicle, of a permissive speed device movable between a maximum clear position and a minimum danger position, actuating means for effecting such movements, a controller for governing the movement of the permissive speed device, means for stopping the permissive speed device, when so moved, in a caution position between the clear and danger positions, and means governed by said controller for effecting the actuation of the stopping means.

7. In apparatus of the character set forth, the combination with a vehicle, of a permissive speed device movable between a maximum clear position and a minimum danger position, actuating means for effecting such movements, a controller for governing the movement of the permissive speed device, means for stopping the permissive speed device, when so moved, in a plurality of caution positions between the clear and danger positions, and means governed by said controller for effecting the actuation of the stopping means to cause the stoppage of said permissive speed device at any of the caution positions.

8. In apparatus of the character set forth, the combination with a vehicle, of a permissive speed device movable between a maximum clear position and a minimum danger position, a controller therefor, a device for stopping the permissive speed device in a caution position between the maximum clear position and the minimum danger position, a controller for the stopping device, means governed by the first controller for moving the permissive speed device, and means governed by the second controller for actuating the stopping device.

9. In apparatus of the character set forth, the combination with a vehicle, of a permissive speed device movable between a maximum clear position and a minimum danger position, a controller therefor, a device for stopping the permissive speed device in a caution position between the maximum clear position and minimum danger position, a controller for the stopping device, means governed by both controllers for moving the permissive speed device, and means governed by the second controller for actuating the stopping device.

10. In apparatus of the character set forth, the combination with a vehicle, of a permissive speed device movable between a maximum clear position and a minimum danger position, a controller for said device, a plurality of devices for stopping the permissive speed device in a plurality of caution positions between the maximum clear and minimum danger positions, a controller for each stopping device, means governed by the various controllers for moving the permissive speed device, and means governed by the last mentioned controllers for selectively actuating the stopping devices.

11. In apparatus of the character set forth, the combination with a vehicle, of a permissive speed device movable between a maximum clear position and a minimum danger position, clear and danger signals, means for thus moving the device, means for respectively operating the signals accordingly as the permissive speed device is thus moved and positioned, means for stopping the speed device when actuated by the moving means in a caution position between the clear and danger positions, a caution signal, and means for effecting the operation of the caution signal and stopping means.

12. In apparatus of the character set forth, the combination with a vehicle, of a permissive speed device movable between a maximum clear position and a minimum danger position, clear and danger signals, means for thus moving the device, means for respectively operating the signals accordingly as the speed device is thus moved and positioned, means for stopping the permissive speed device when actuated by the moving means in a caution position between the clear and danger positions, a caution signal, and means for effecting the operation of the caution signal and stopping means, including a controller for preventing the operation of the clear and danger signals when the caution signal is operated.

13. In apparatus of the character set forth, the combination with a vehicle, of a permissive speed device movable between a maximum clear position and a minimum danger position, clear and danger signals, a controller for the permissive speed device and signals, a device for stopping the permissive speed device in a caution position, a caution signal, a controller for the stopping device and caution signal, means governed by the first controller for effecting the movement of the speed device and the operation of the clear and danger signals, and means governed by the second controller for effecting the operation of the stopping device and the caution signal.

14. In apparatus of the character set forth, the combination with a vehicle, of a permissive speed device movable between a maximum clear position and a minimum danger position, clear and danger signals, a controller for the permissive speed device and signals, a device for stopping the permissive speed device in a caution position, a caution signal, a controller for the stopping device and caution signal, means governed by both controllers for effecting the movement of the speed device and the operation of the clear signal, and means governed by the second controller for effecting the operation of the stopping device and the caution signal.

15. In apparatus of the character set forth, the combination with a vehicle, of a permissive speed device movable between a maximum clear position and a minimum danger position, clear and danger signals, a controller for the permissive speed device and signals, a device for stopping the permissive speed device in a caution position, a caution signal, a controller for the stopping device and caution signal, means governed by the first controller when in one condition for maintaining the permissive speed device in its maximum clear position and operating the clear signal, and when in another condition effecting the operation of the permissive speed device towards its minimum danger position and effecting the operation of the danger signal, and means governed by the second controller for operating the stop, effecting the operation of the caution signal, and preventing the operation of the clear signal.

16. In apparatus of the character set forth, the combination with a vehicle, of means for indicating danger and also a plurality of safe rates of speed for said vehicle under different conditions, and means for automatically causing said means to indicate danger or any of the safe rates of speed accordingly as the conditions change and maintaining the proper indication while the same condition lasts.

17. In apparatus of the character set forth, the combination with a vehicle, of means for indicating a maximum safe rate of speed, a danger condition and a plurality of intermediate sub-maximum speeds under different conditions, and means for automatically causing the indicating means to indicate the maximum speed, danger, and any of the intermediate speeds accordingly as the conditions change and maintaining the proper indication while the same condition lasts.

18. In apparatus of the character set forth, the combination with a vehicle, of means for indicating danger and also a plurality of safe rates of speed for said vehicle under different conditions, and means including trackside mechanism located adjacent to permanent hazards along the way to cause the said indicating means to indicate the maximum speed, danger or any of the said intermediate speeds according to the hazard and maintaining the proper indication until the hazard is passed.

19. A safety apparatus for the automatic control of the speed of moving vehicles along a trackway, comprising a device on the vehicle for determining a permissible maximum speed under safety conditions, and a permissible minimum speed under danger conditions, means for automatically moving the permissible speed determining device from a maximum to any one of a plurality of submaximum positions, including a highway control of such means through signal rails arranged along the path of the vehicle corresponding to permanent hazards along such path.

20. An apparatus for the control of vehicles moving along a trackway, comprising a device on the vehicle adapted by its position to establish a variable permissible speed for the vehicle, means adapted to retard the vehicle whenever such established speed is exceeded, in combination with means along the trackway and electrically controlled device actuated therefrom whereby the permissible speed device may be moved to any predetermined position corresponding to a safe speed for the vehicle.

21. An apparatus for the control of vehicles moving along a trackway comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved to any predetermined submaximum position.

22. An apparatus for the control of vehicles moving along a trackway, comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved from a maximum to any selected one of a plurality of submaximum positions.

23. An apparatus for the control of vehicles moving along a trackway comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved to any predetermined submaximum position and retained there while the vehicle is traversing a predetermined distance.

24. An apparatus for the control of vehicles moving along a trackway, comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved from a maximum to any selected one of a plurality of submaximum positions and retained there while the vehicle is traversing a predetermined distance.

25. An apparatus for the control of vehicles moving along a trackway, comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved to any predetermined position corresponding to a safe speed for the vehicle, and further means along the highway whereby temporary danger conditions cause the device while at any position to be moved toward a safe minimum speed position.

26. An apparatus for the control of vehicles moving along a trackway, comprising a device on the vehicle adapted by its position to establish a variable permissible speed for the vehicle, means adapted to retard the vehicle whenever such established speed is exceeded, in combination with means along the trackway and electrically controlled devices actuated therefrom whereby the permissible speed device may be moved from a maximum to any selected one of a plurality of submaximum positions, and further means along the highway whereby temporary danger conditions cause the device while at any position to be moved toward a safe minimum speed position.

27. In an apparatus for the control of vehicles movable along a railway, in combination, a trackway; a vehicle adapted to travel upon said trackway; means, including electrical devices, on the vehicle for determining a permissible speed therefor; traffic controlling devices located along the trackway and adapted to vary the electrical conditions of said means to thereby indicate different permissive speeds for said vehicle.

28. In an apparatus for the control of vehicles movable along a railway, in combination; a track divided into units; train controlling means associated with each unit; means whereby a train produces different electrical conditions in said train controlling means in the rear of that train; said electrical condition of each unit being regulated by said means in accordance with the distance between that unit and the unit occupied by said train; and means on a following train responsive to the electrical conditions of said train controlling means for regulating the speed of said following train in accordance with the distance the following train travels after passing said train controlling means.

29. In an apparatus for the control of vehicles movable along a trackway, in combination; a vehicle; a trackway divided into units; controlling means associated with each unit; means whereby desired different electrical conditions are caused to exist in the vehicle controlling means, and means on the vehicle responsive to the electrical conditions of said vehicle controlling means for regulating the permissible speed in accordance with both permanent and temporary hazards.

30. In a vehicle speed control equipment, the combination with a speed controlled device for controlling the vehicle, of a mechanism for adjusting said device to act at a reduced speed and means for limiting the action of said mechanism.

In testimony whereof I affix my signature.

PAUL JOHN SIMMEN.